N. L. OLSON.
TRACTION BEARING WHEEL.
APPLICATION FILED DEC. 4, 1915.

1,228,472.

Patented June 5, 1917.
3 SHEETS—SHEET 2.

Witnesses
Chas. W. Stauffiger
Anna M. Dorr

Inventor
Nels L. Olson,
By
Attorneys

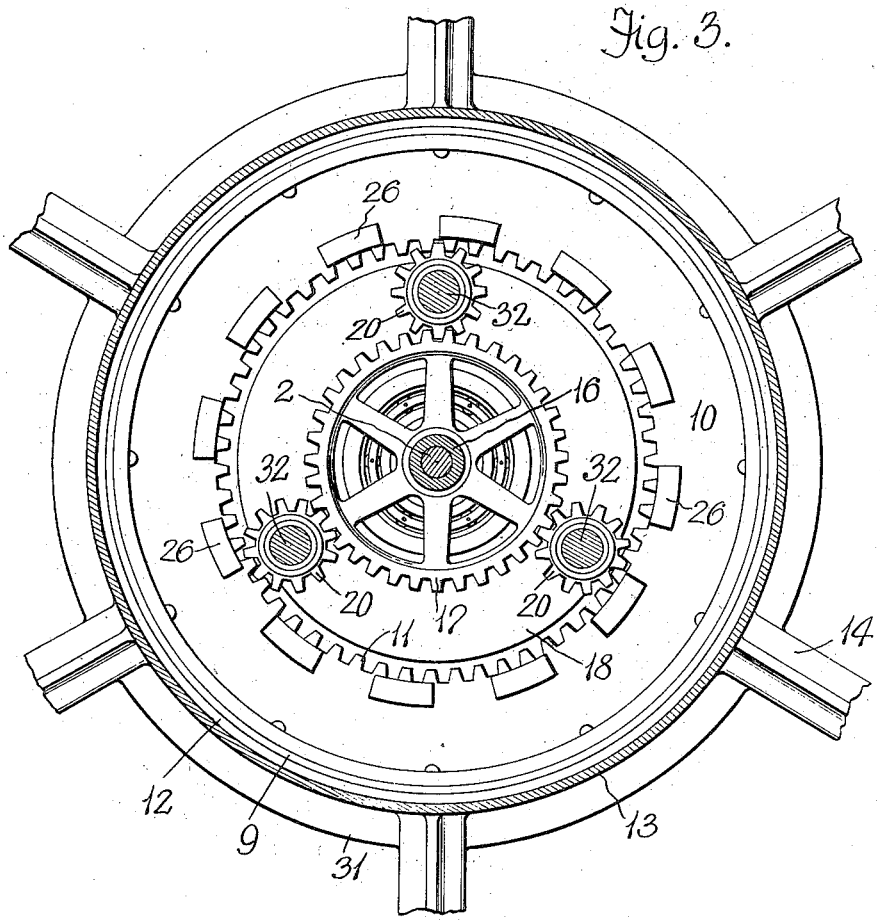

UNITED STATES PATENT OFFICE.

NELS L. OLSON, OF DETROIT, MICHIGAN.

TRACTION BEARING-WHEEL.

1,228,472. Specification of Letters Patent. Patented June 5, 1917.

Application filed December 4, 1915. Serial No. 65,004.

*To all whom it may concern:*

Be it known that I, NELS L. OLSON, a citizen of the United States of America, residing at Detroit, in the county of Wayne and State of Michigan, have invented certain new and useful Improvements in Traction Bearing-Wheels, of which the following is a specification, reference being had therein to the accompanying drawings.

This invention relates to traction bearing wheels for converting an automobile of roadster type to a draft or traction vehicle or for heavy loads and to an arrangement thereof whereby change speed is supplied, and whereby, if desired the ordinary differential gearing of the rear drive shaft may be discarded.

The invention consists in the matters hereinafter set forth, and more particularly pointed out by the appended claims.

In the drawings,

Fig. 3 is a view taken on or about line III—III of Fig. 1.

Figure 1:
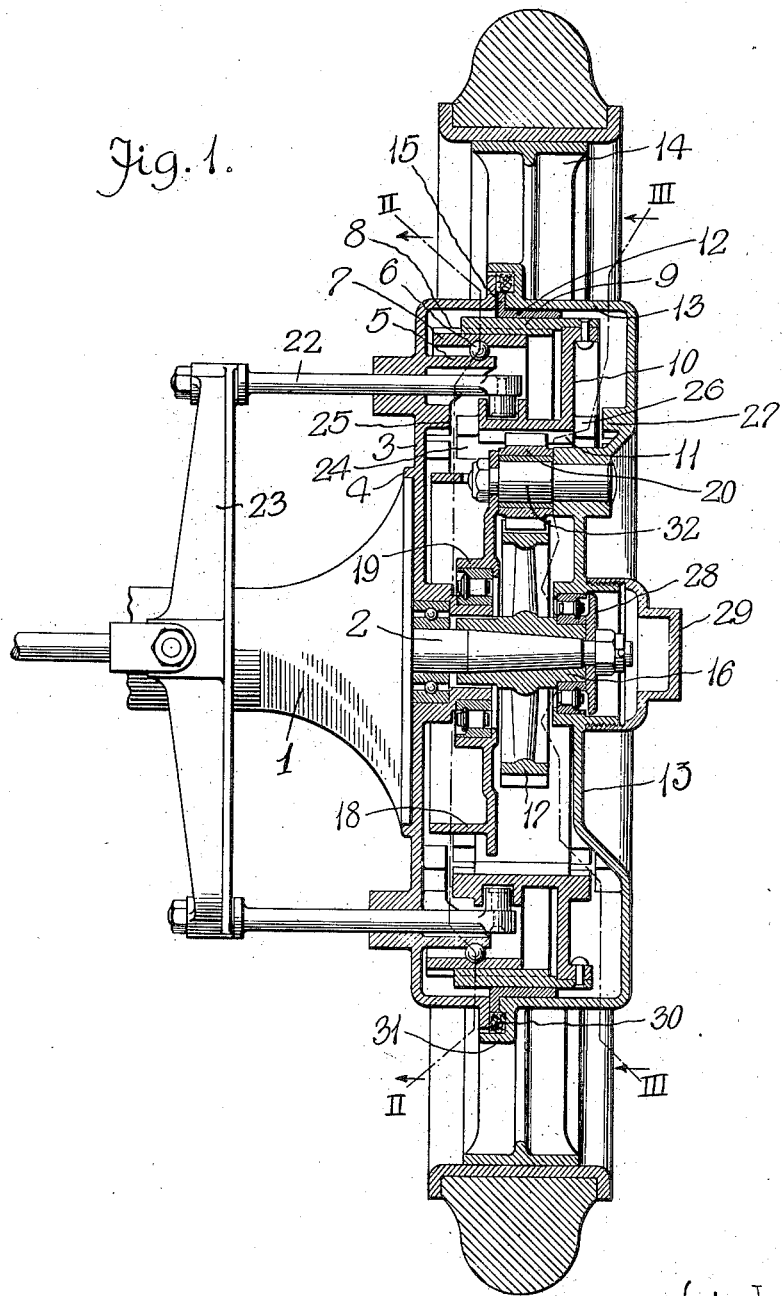
Figure 1 is a view partially in section and partially in elevation of a wheel embodying features of the invention.
Figure 2:
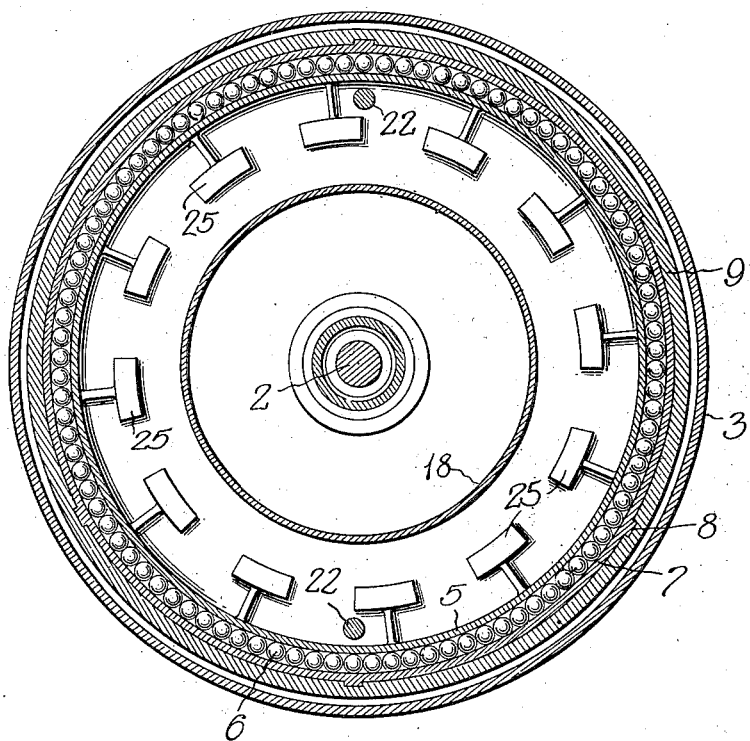
Fig. 2 is a view taken on or about line II—II of Fig. 1.

As herein shown as applied to a rear axle of a common type including a fixed or stationary housing 1 and a live axle 2, a stationary housing 3 is secured to the extremity of the housing 1, an annular centering rib 4 being provided if desired and the parts being detachably engaged by any suitable means. An annular flange 5 on the outer face of the stationary housing, forms an inner raceway for anti-friction members, such as balls 6 which center an outer annular raceway member or ring 7. Ribs 8 on the periphery of the annulus 7 are in sliding engagement with corresponding keyways formed on the inner periphery of an exterior rim 9 carried by the extended web 10 of an internal gear 11. The exterior rim 9 of the internal gear is rotatable in an annular bushing 12 that is fixed in the periphery of a drum 13 forming part of a traction bearing wheel, indicated generally at 14. An end flange 15 on the bushing abuts a corresponding flange on the fixed casing 3. Suitable anti-friction bearings center the drum 13 on the hub 16 of a driving gear 17 made fast to the live axle 2.

As a further detail of good construction, planet pinion studs 32 in the nave or drum 13 of the main wheel, on which the planet pinions are arranged in mesh with the driving gear 17, carry a brake drum 18, the hub 19 of the latter engaging one of said bearings of the main wheel.

The internal gear 11, which meshes with the pinions 20 on the studs 32, has a sufficiently wide face to remain in engagement with said pinions, whether it is shifted by means of yoke pins 22 and yoke 23 so that lugs 24 on its face interlock with corresponding projections 25 on the main housing, or whether it be moved in the other direction so that projections 26 on its outer face engage with corresponding projections 27 on the web of the wheel drum or nave 13.

As a further detail of construction a retaining washer 28 holds the wheel in position on the live shaft, a dust cap 29 being used to inclose the hub members. A felt washer 30 or like dust excluding means may also be used at the junction of the outer rim of the stationary member 3 and the adjacent flange 31 which is formed on the wheel drum.

As a result of this construction a direct drive of the wheel from the live shaft may be obtained by the appropriate manipulation of the internal gear so as to lock the driving gear and wheel body to turn in unison. Or by shifting the internal gear into locked relation with the stationary hub the desired speed reduction is retained. Furthermore if preferred, the live shaft may be made solid and by leaving one or the other of the wheels free to turn idly, by having the internal gear in neutral position the effect of a differential drive is obtained without the necessity of a differential gearing.

The wheel as a whole is readily attached or detached as a substitute for the standard bearing wheel and when attached carries the load that is imposed on the stationary housing without adding to the strain on the load bearing member of the axle itself. This feature makes the wheel available for increasing the load capacity of a light touring car without in any way changing the car itself.

Obviously, changes in the details of construction may be made without departing from the spirit of the invention and I do not care to limit myself to any particular form or arrangement of parts.

What I claim is:—

1. A traction bearing wheel comprising a housing adapted to be secured non-rotatably to the housing of a driving axle, a driving gear adapted to be secured non-rotatably to the live axle of a driving axle concentric with the housing, a wheel including a drum concentric with the housing, an internal gear journaled in the drum and planet pinions on the drum meshing with the internal gear and with the driving gear, the internal gear being axially reciprocable and being adapted to interlock effectively with the stationary housing and with the drum, and means for manipulating the gear.

2. A traction bearing wheel comprising a housing adapted to be secured to the housing of a drive axle, a driving gear adapted to be secured non-rotatably to the drive shaft of a driving axle, a traction wheel including a drum concentric with the housing, an internal gear journaled in the drum, planet pinions on the drum meshing with the driving and internal gears, the latter gear being adapted to be shifted to lock selectively with the stationary housing and with the drum and a yoke adapted to be mounted on the housing of the axle and to engage the gear to shift the latter.

3. The combination with a driving axle having an exterior stationary housing and a live driving shaft, of a traction bearing wheel including a housing adapted to be secured non-rotatably to the axle housing, a driving gear adapted to be non-rotatably engaged on the drive shaft, bearings on the hub of the driving gear, a traction wheel body including a drum journaled on the hub bearings of the driving gear, an annulus rotatable on the housing, with which the internal gear has longitudinally reciprocable and non-rotatable engagement, the latter being adapted to interlock with the housing when at one limit of motion and with the drum when at the other limit of motion, and planet pinions carried by the drum entrained with the internal gear and driving gear.

4. The combination with a driving axle having an exterior housing and a live shaft, of a traction bearing wheel including a drum concentric with the driving shaft and having an internal planetary gear system the drive member of which is keyed to the drive shaft, and the follower member of which is rotatable in the drum, together with a longitudinally reciprocable annulus journaled in the housing, in non-rotatable engagement with the internal follower member, the latter being adapted to interlock selectively with the housing and with the drum, and means for manipulating the follower member.

5. The combination with a driving axle including a stationary housing and a live shaft, of a traction bearing wheel having a drum housing an internal planetary gear train, the driving member of which is made fast to the live shaft and the external member of which is journaled in the drum, a housing secured to the stationary housing of the shaft, and an annulus journaled in the housing in non-rotatable and longitudinally reciprocable engagement with the internal gear of the train, the latter being adapted to interlock with the housing when at one limit of its motion and with the drum when at the other limit thereof together with manually operable means for shifting the internal gear.

6. The combination of a driving axle including a stationary housing, and a live shaft, of a traction bearing wheel including a housing adapted to be non-rotatably secured to the stationary housing, a drum concentric therewith housing an internal planetary gear train, the driving member of which is secured to the live axle and the internal member of which rotates in the drum, an annulus rotatable in the housing and non-rotatable in the internal follower member of the train, the latter being shiftable axially to interlock with the housing or with the drum, and means for shifting the follower arranged and mounted on the housing of the driving axle.

7. A traction bearing wheel comprising a housing adapted to be secured to the housing of a drive axle, a traction wheel including a drum concentric with the housing, gearing interconnecting the traction wheel with the drive shaft of the driving axle and lying within the housing, and means for locking the gear and wheel to drive the latter at axle speed or at different speed from the axle.

8. An auxiliary transmission for motor vehicles, comprising in combination with the axle, the housing therefor and the wheels journaled on the axle, a gear wheel keyed to the axle at the inner face of each wheel, pinions journaled on the inner face of each wheel and meshing with the gear wheel, an internal gear ring mounted coaxial with the wheel and meshing with the pinions, and means operable at will for fixing the gear ring to the axle housing or to the wheel.

9. An auxiliary transmission for motor vehicles, comprising in combination with the axle, the housing therefor and the wheels journaled on the axle, of means arranged between the housing and the wheels for connecting the axle directly or indirectly with the wheels, and for releasing the axle from the wheels, said means comprising a gear wheel rigid with the axle at each wheel, pinions journaled on the wheel and meshing with the gear wheel, an internal gear ring journaled coaxial with the wheel and meshing with the pinions, and a common actuating means for effecting a fixing of the gear ring to the housing or to the wheel and for releasing the wheel from the axle.

In testimony whereof I affix my signature in presence of two witnesses.

NELS L. OLSON.

Witnesses:
ANNA M. DORR,
CHAS. W. STAUFFIGER.